United States Patent

Misiak et al.

[11] Patent Number: 5,320,505
[45] Date of Patent: Jun. 14, 1994

[54] ELECTROCHEMICAL MACHINING OF SCROLL WRAPS

[75] Inventors: Michael W. Misiak, Monroe, Mich.; John M. Bourg, Holland, Ohio

[73] Assignee: Tecumseh Products Company, Tecumseh, Mich.

[21] Appl. No.: 26,522

[22] Filed: Mar. 4, 1993

[51] Int. Cl.⁵ .............................................. F01C 1/02
[52] U.S. Cl. ................................. 418/55.1; 29/825; 204/224 M; 204/129.5; 204/129.7; 204/212
[58] Field of Search ............... 418/55.2, 55.1; 29/825; 204/224 M, 212, 129.5, 129.7

[56] References Cited

U.S. PATENT DOCUMENTS

| | | | |
|---|---|---|---|
| 3,352,770 | 11/1967 | Crawford | 204/143 |
| 3,634,217 | 1/1972 | Bedi | 204/146 |
| 3,896,012 | 7/1975 | Buschbaum | 204/129 |
| 4,287,404 | 9/1981 | Convers | 219/69 |
| 4,317,019 | 2/1982 | Itoh | 219/69 |
| 4,341,939 | 7/1982 | Briffod | 219/69 |
| 4,456,516 | 6/1984 | Schaffner | 204/224 M |
| 4,487,671 | 12/1984 | McGeough | 204/129 |
| 4,504,370 | 3/1985 | Lindner | 204/129 |
| 4,752,367 | 6/1988 | Vishnitsky | 204/224 M |
| 5,088,906 | 2/1992 | Richardson | 418/55.2 |

FOREIGN PATENT DOCUMENTS 0122067 10/1984 European Pat. Off. ........... 418/55.2

Primary Examiner—Richard A. Bertsch
Assistant Examiner—Charles G. Freay
Attorney, Agent, or Firm—Baker & Daniels

[57] ABSTRACT

A method and apparatus for electrochemically machine lapping a matched set of fixed and orbiting scroll members for use in a scroll compressor. The orbiting scroll member is orbited in a short stroke relative to the fixed scroll member while an electrolyte is pumped between the scroll wraps. An electric current is passed through the fixed and orbiting scroll wraps to thereby electrochemically machine away high profile areas on corresponding metal wear surfaces. During the machining process, the clearance spacing between the scrolls is tightly controlled to prevent contact between the scrolls.

13 Claims, 3 Drawing Sheets

ELECTROCHEMICAL MACHINING OF SCROLL WRAPS

BACKGROUND OF THE INVENTION

The present invention relates generally to scroll compressors and, more particularly, to a method and apparatus for electrochemically machining a matched set of scroll members for use in such compressors, thereby ensuring proper sealing between respective wrap surfaces of the scroll members during compressor operation.

A typical scroll compressor comprises two scroll members, each having an involute wrap, wherein the respective wraps interfit to define a plurality of closed compression pockets. When one of the scroll members is orbited relative to the other, the pockets decrease in volume as they travel between a radially outer suction port and a radially inner discharge port, thereby conveying and compressing the refrigerant fluid It is generally believed that the scroll-type compressor potentially offers quiet, efficient and low maintenance operation in a variety of refrigeration system applications. However, several design and manufacturing problems persist. For instance, the operating efficiency of a compressor depends upon the integrity of axial and radial sealing between the scroll members. One type of leakage that can occur is between compression pockets of the scroll compressor at those locations where the wrap walls sealingly contact each other to define the boundaries of the moving compression pockets. Leakage between the wraps themselves or between the tips of the wraps and the opposing scroll base plates reduce the efficiency and capacity of the compressor.

Conventional scroll machine practice has been to use a numerically controlled profiling machine, or NC machine, to cause a milling tool and workpiece to undergo relative movement according to mathematical equations descriptive of an intended or desired involute curve. However, deviations of the milling cutter from the desired involute path occur due to errors in the movement of the machine caused by constantly changing forces against the two cartesian axes and time lags in the servo response of the drive motor. Further, this type of milling machine uses rotating end mills that potentially cause a swirl finish on the scroll wraps and wrap tips. This swirl finish, caused by an incorrectly ground or worn milling head, creates an uneven finish that causes a distinctive leak path over the scroll wrap tip, thereby reducing compressor efficiency. High tooling costs are also associated with using such complex milling machinery.

A previous solution to the leakage problem was to "wear in" the scroll wraps one to another. In this system, the compressor would operate until the scroll wrap surfaces wear to the point where they are in constant contact and mate perfectly. A drawback to this solution is that it may take literally days of wear in time per compressor to achieve the needed leakproof seal between the matched scroll wraps. It is undesirable to require compressor purchasers to wear in the compressors they purchase. Further, there is no feasible way of constructing and operating a production factory to contain thousands of operating scroll compressors just to wear in the scrolls.

Various types of wrap finishing have also been utilized to prevent and reduce the leak paths between the scrolls. Conventional thought has been to increase the smoothness of the scroll wear surfaces to that of almost a mirror like finish. Electroplating, deburring, and ultrasonic leveling systems have been utilized to construct smooth wrap surfaces and edges. These current wrap finishing processes are expensive and require a long cycle time to produce.

The present invention is directed to overcoming the aforementioned problems associated with prior methods of manufacturing scroll members for use in scroll compressors, wherein it is desired to create a matched set of fixed and orbiting scroll members without requiring an extended run-in time for the compressor by the use of electrochemical machining (ECM).

Electrochemical machining is a process of shaping and removal of metal from a work piece by an electrochemical process utilizing an external current source and a flow of electrolyte between a work tool and a work piece to be shaped. Metal removal from the scroll members is effected by the process of ionizing a conductive electrolyte between the scrolls thereby dissolving metal atoms from high profile points on wear surfaces.

SUMMARY OF THE INVENTION

The present invention overcomes the problems and disadvantages of the prior art by providing an apparatus and method for simultaneously electrochemically machine lapping a matched set of fixed and orbiting scroll members, wherein the fixed and orbiting scroll members are electrochemically machined during a simulated compressor operation. In accordance with the machining apparatus and method of the present invention, a matched scroll member set having enhanced sealing characteristics is capable of being manufactured.

Generally, the invention provides a method and apparatus for electrochemically machining the wear surfaces of a pair of scroll members, wherein the scroll members are caused to orbit relative one to another during the electrochemical machining process so that wear surfaces having a high profile may be electrochemically eroded away. Accordingly, any deviation on the scroll members wear surfaces that create a leak path may be electrochemically machined away, resulting in a pair of scroll members that more perfectly seal together.

More specifically, the invention provides an apparatus and method whereby a pair of scroll members are held in a fixed axial relationship to one another while one scroll member is caused to simulate orbiting movement relative to the other scroll member. The operational movement of the orbiting scroll member is a "simulated" movement of the orbiting created within the scroll compressor since it is a shortened stroke orbit compared to its normal orbit within a compressor. The shortened stroke of the orbiting scroll orbit causes it to approach in a radial direction, but not touch, the fixed scroll wraps.

The electrochemical machining technique includes injecting an electrolyte solution between the non-contacting scrolls thereby permitting removal of electrochemical products and eroded material in solution. While the electrolyte is between the two scroll members, an electric current is passed through the two scrolls and electrolyte to electrochemically machine and erode the scroll wraps. The electrochemical machining (ECM) is conducted while the orbiting scroll member orbits in a short stroke manner relative to the fixed scroll member.

According to one aspect of the present invention, a pair of scroll wraps are separated by a selected axial distance, so that the distance between one wrap tip and its opposed scroll base plate is substantially the minimum distance during the short stroked orbiting motion (i.e. the distance between one wrap surface to an opposed wrap surface). This proportion maintains an even erosion of the scroll members on all wear surfaces.

An advantage of the electrochemical scroll machining system of the present invention is that it reduces leak paths through the orbiting and fixed scroll member set. The system causes corresponding portions of the scroll set to more closely interfit together because the high portions on the scroll members are eroded away by the ECM process.

Another advantage of the electrochemical scroll machining system of the present invention is that the necessary run-in time for a set of scroll members is reduced, since it is no longer necessary to excessively work off high points on respective wrap surfaces.

A further advantage of the electrochemical scroll machining system of the present invention is that it creates a uniform finish on the wear surfaces of the scroll members. The system creates a finish much like a sand blasted surface. Although opposite to conventional thinking, this rougher surface operates more efficiently than normal scroll member wear surfaces and reduces wear in time. This sandblasted type finish averages out the surface profile of the scroll members thereby preventing any swirl type finishes remaining from initial machining of the scroll wraps and reducing possible leak paths.

Yet another advantage of the electrochemical scroll machining system of the present invention is that of uniform stock removal from all wear edges creating a substantially matched scroll set and thereby reducing the cycling time to produce a finished matched scroll set in a production environment.

The invention, in one form thereof, provides a method for electrochemical machine lapping a set of two scroll members. The method includes the steps of intermeshing the scroll members so that a clearance space exists between the members, pumping an electrolyte into the clearance space and then applying an electric current between the scroll members and through the electrolyte so that electrochemical removal of metal from the scroll set takes place. During the method, the intermeshed scroll members are orbited relative to each other thereby causing removal of metal adjacent all the wear surfaces. Further, the orbiting of the scroll members is conducted with a short stroke to prevent contact between the scroll members in a radial direction. The intermeshed members are axially spaced apart so that the minimum radial clearance space between the scroll wraps is substantially equal to the clearance space between each said wrap and an opposing scroll wrap base plate.

In another form of the invention, a compressor has a housing including a scroll set disposed within the housing having a fixed scroll member and an orbiting scroll member both having electrochemically machined surfaces prepared by orbiting the scroll members together, exposing areas between the scroll set to an electrolyte solution, and applying an electric charge to one of the scroll members to electrochemically remove portions of the scroll set. The compressor includes a drive means to orbit the orbiting scroll relative to the fixed scroll.

In another form of the invention, an apparatus for electrochemically machining respective surfaces of a complimentary pair of fixed and orbiting scroll members for use in a scroll compressor includes a mechanism for holding the fixed and orbiting scroll members in aligned positions such that the involute wrap faces of the fixed orbiting scroll members interfit. A supply of electrolyte is located between the fixed and orbiting scroll members. A source of electric current applies a current through said electrolyte between the fixed and orbiting scroll members while a drive means orbits the orbiting scroll member relative to the fixed scroll member during application of the electric current to enable electrochemical machining of the fixed and orbiting scroll members.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 2:
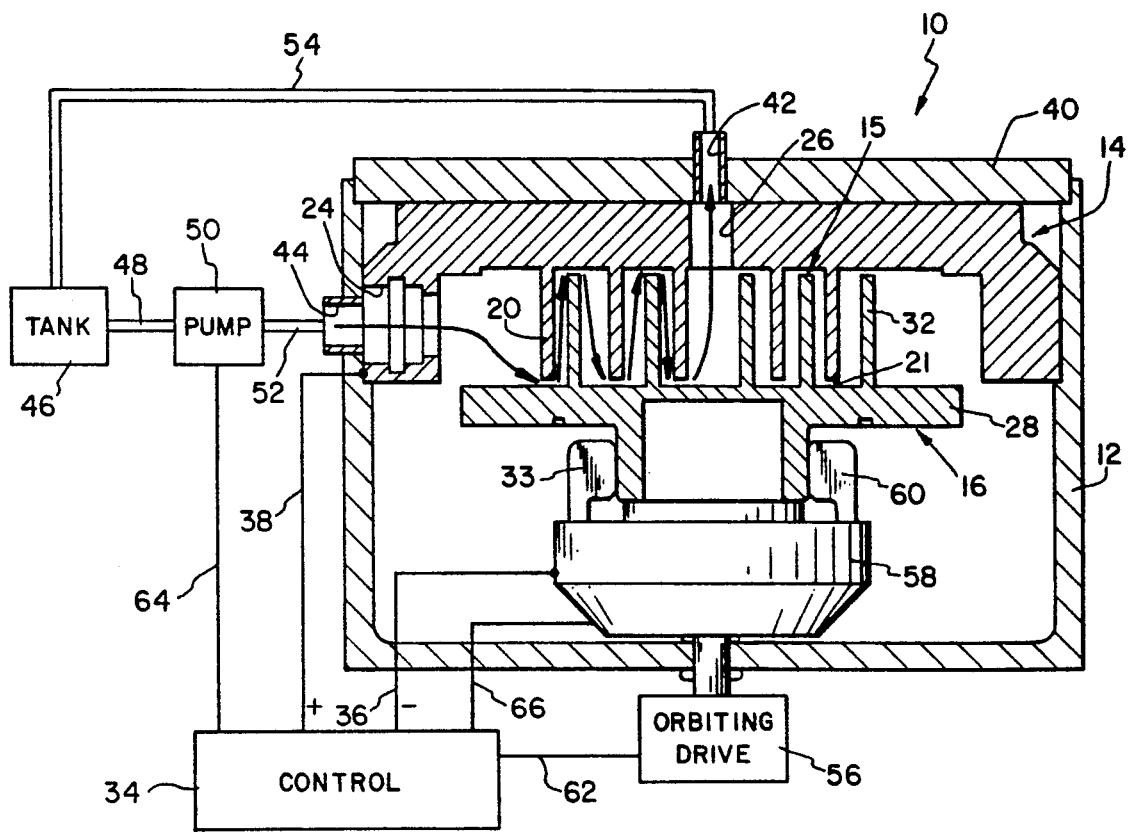
FIG. 2 is a diagrammatic representation of the electrochemical machining apparatus.

An exemplary embodiment of the invention is shown in the drawings, in particular by referring to FIG. 2, there is shown a machining system 10 for electrochemically manufacturing a matched set of fixed and orbiting scroll members in accordance with the present invention.

The electrochemical machining system 10 of the present invention utilizes a process whereby stock is removed from an interfitting set of scroll members.

With the electrochemical machining process, metal removal from the scroll members is effected by ion exchange between the scroll members to be shaped and the reaction medium. The reaction medium, a conductive electrolyte, is ionized by the voltage between one scroll member, which serves as cathode, and the other scroll member, which serves as anode.

The disassociated molecules of the electrolyte move, under the influence of an electric field, to the electrode having a polarity opposite their own charge polarity. Hydronium ions are discharged at the cathode and liberate hydrogen, and hydroxyl ions move to the anode, lose their charge and there dissolve metal atoms having a valence corresponding to such charge. These dissolved metal atoms react with the hydroxyl ions and form a weakly conducting metal hydroxide compound which is insoluble in the electrolyte. The insoluble metal hydroxide must be carried out by the flowing electrolyte itself, which accordingly must be injected into the reaction zone at very high pressure.

Figure 1:
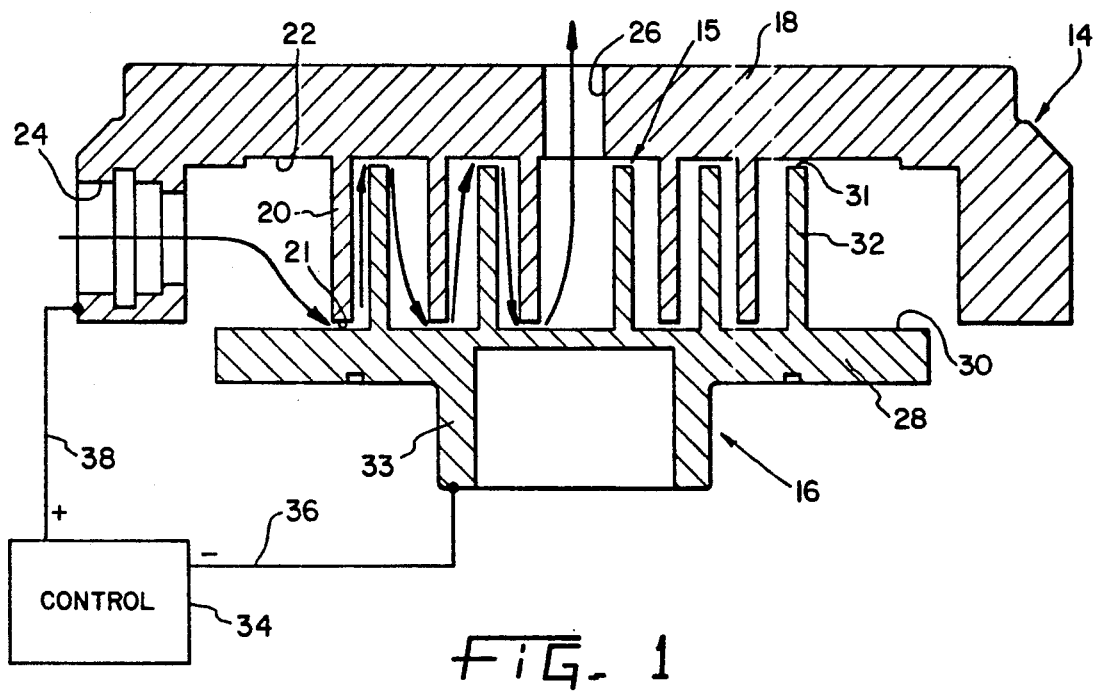
FIG. 1 is a schematic diagram of the electrochemical machining process.

The method of system 10 includes utilizing a fixed scroll member 14 along with an interfitting orbiting scroll member 16. As shown in FIG. 1, fixed scroll member 14 includes a base plate member 18 to which is attached an involute spiral wrap member 20. Wrap member 20 is integrally formed or attached to a inner surface 22 of base plate member 18. As shown in FIG. 1, fixed scroll member 14 includes a fluid inlet port 24 and a fluid outlet port 26.

Orbiting scroll member 16 comprises a generally flat orbiting scroll plate 28 including a face surface 30 having an involute wrap 32 thereon. Involute wrap 32 includes a wrap tip 31. On a surface opposite face surface 30 is located a hub 33, which is used to connect orbiting scroll member 16 to the drive means of a compressor.

The fixed and orbiting scroll members 14 and 16 are preferably formed out of cast iron. Although other materials may be used to construct the scroll members 14 and 16, for the present process to operate they must be electrically conductive.

The scroll members 14 and 16 are assembled such that the orbiting scroll wrap 32 interfits with the fixed scroll wrap 20 in a known way that usually permits compression of refrigerant when orbiting scroll member 16 is orbited relative to fixed scroll 14. However, in the present process, orbiting scroll member 16 is prevented from contacting fixed scroll member 14 either at its plate member 18 or wraps 20. Direct contact between the scrolls must be avoided for proper electrochemical machining to prevent short circuiting.

As shown in FIG. 1, a clearance space 15 is created between fixed scroll 14 and orbiting scroll 16 at all locations. Clearance space 15 is more clearly shown by double headed arrows in FIG. 4. An electrical control unit 34 is connected by a lead 36 to orbiting scroll 16 and a lead 38 to fixed scroll 14. The hookup is shown in FIGS. 1 and 2. The control unit 34 permits the electrical hookup required for electrochemical machining such that a positive charge is connected to the scroll member that is to be electrochemically eroded while the negative lead runs to the opposite scroll member.

The process includes pumping an electrolyte, such as NaCL or NaNO3 in solution with water, between the scroll members 14 and 16 to complete the electric circuit generated by control unit 34. Although NaNO3 is the preferred electrolyte component, other suitable types of similar salts which make possible the ionization may be used, as is known in the art. One such electrolyte utilized is sold under the name SG1010 manufactured by Surftran, Division of Robert Bosch Corp., located in Madison Heights, Mich. Although this is the preferred electrolyte solution, others may be utilized.

After time, the concentration of the electrolyte must be restored to its initial value. One way would be to continuously pump fresh electrolyte between the scrolls. Alternatively, a filter system may be employed, utilizing magnets or paper filters to remove the metal ions in the solution, thereby recycling the electrolyte.

FIG. 2 shows the apparatus to perform the electrochemical machining process. A housing 12 is constructed to retain both fixed scroll 14 and orbiting scroll 16. Housing 12 is closed by a top cover 40 having a passageway 42 that aligns and is in communication with fluid outlet port 26. Housing 12 includes a fluid inlet passageway 44 that is in communication with fluid inlet port 24 of fixed scroll 14. A tank 46 containing a supply of electrolyte is connected by a pipe 48 to a pump 50. Pump 50 is connected by pipe 52 to inlet passageway 44 in housing 12.

During actuation of pump 50, electrolyte is removed from tank 46 through pipe 48 and pumped through pipe 52 into inlet passageway 44 and fluid inlet port 24. This electrolyte is pumped through clearance space 15, as shown by arrows in FIGS. 1–3 and 5, between fixed scroll 14 and orbiting scroll 16. Electrolyte then flows through outlet 42 and passageway 24 into a return line 54 leading back to tank 46.

Orbiting scroll member 16 is held in a spaced relationship away from fixed scroll 14. Orbiting scroll 16 is attached to an orbital drive means 56 by a clamping means such as an automated clamp or chuck 58. As shown in FIG. 2, chuck 58 includes gripping fingers 60 that attach about orbiting scroll hub 33. Alternatively, other clamping arrangements may be used to attach orbiting scroll member 16 to drive means 56. Orbital drive means is of conventional design, such as a motor and Oldham mechanism.

FIG. 2 shows control unit 34 with electric current leads 36 and 38 routed to the orbiting and fixed scrolls 16 and 14. For ease of use in manufacturing the scrolls, lead 36 may be connected to the metal part of chuck or clamp 58 instead of directly to orbiting scroll 16. Control unit 34 also includes a line 62 to control operation of orbiting drive 56. Control box 34 also includes control lead 64 to pump 50 and a control lead 66 to clamp or chuck 58. Control unit 34, during operation, may alternatively energize or de-energize orbiting drive 56. In addition, through control line 66, control unit 34 may open and close chuck or clamp 58 about orbiting hub 33 for selective attachment. Control lead 64 permits the control unit 34 to operate pump 50 for proper electrolyte flow through housing 12. Control unit 34 may be constructed from a hardened personal computer system, programmable controller, or a series of relays as is known in the art. The control unit 34 may also allow manual control of the ECM process. Unit 34 must be capable of conveying and switching the electric current required for ECM. The control unit 34 must also remove current from the scroll members during a short circuit condition.

Orbiting drive means 56, connected to orbiting scroll 16 via clamping means 58, operates during the ECM process to orbit scroll member 16 relative to fixed scroll 14. Of particular interest during the electrochemical machining process is the control of the orbiting motion of orbiting scroll 16 to prevent contact between itself and fixed scroll 14. If orbiting scroll 16 would ever contact fixed scroll 14, the contact may short out control unit 34 because of the amount of current through control lines 36 and 38. During testing, it has been found that a separation distance of approximately 0.01 inch is necessary to prevent arcing and short circuiting, while allowing sufficient room for flow of electrolyte.

Figure 4:
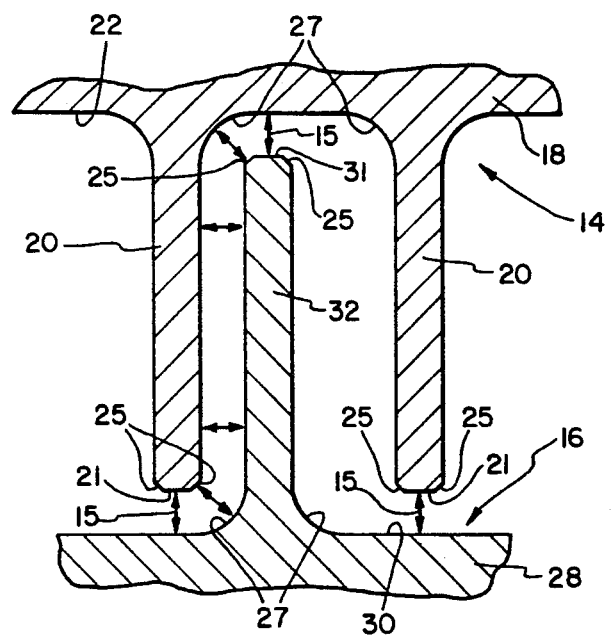
FIG. 4 is an enlarged sectional view of the interfit fixed and orbiting scroll members during the electrochemical machining process.

Of particular interest, to reduce the chance of arcing during operation, is a proper chamfer and spacing between the scroll wraps 20 and 32. In a highly exaggerated fashion, FIG. 4 shows an operational aspect of the system. During operation of the ECM process, a clearance space 15 between fixed scroll wrap 20 and orbiting base plate 28 is required to be some minimum distance. At the same time, a minimum clearance space must be kept between orbiting wrap 32 and the base plate member 18 of fixed scroll 14. It is recommended that these two distances i.e., the minimum axial clearance and the wrap to wrap clearance between the fixed scroll member 14 and orbiting scroll member 16 be kept at a particular size, preferably approximately 0.01 inches apart. Additionally, the minimum clearance space 15 between the wraps 32 and 20 also need to be controlled and preferably approximate the minimum distance axially separating the fixed and orbiting scroll members 14 and 16. By controlling clearance space 15 between the wraps via the orbiting drive means 56 while maintaining an axial separation necessary to prevent arcing, electrochemical machining between the fixed scroll member 14 and orbiting scroll member 16 takes place at an effective rate.

As shown in FIG. 4, each wrap tip 21 or 31 includes a chamfer 25. Further, complementary corners at the base of wraps 21 or 31 include a rounded or curved section 27. These complementary chamfer sections 25 and curved sections 27 smooth the sharp corners of wraps 21 and 31, thereby maintaining substantially the same spacing at all locations (as shown by double head arrows) between the wraps at a particular orbiting angle. This even spacing permits even erosion of metal during the ECM process.

Figure 3:
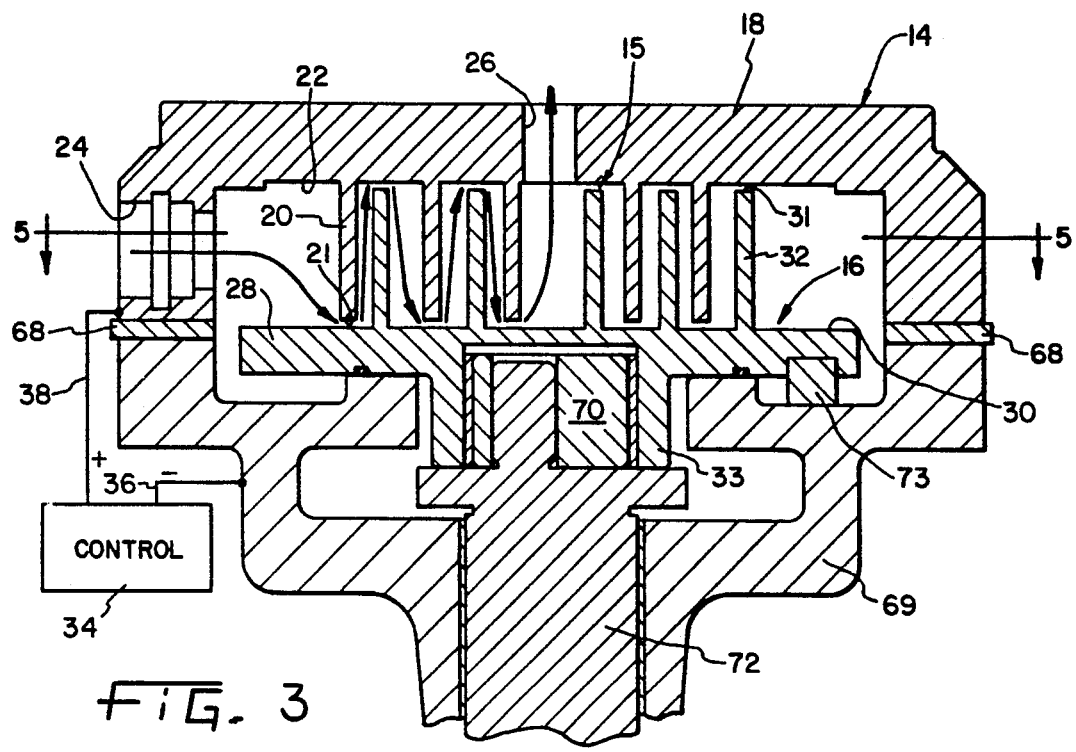
FIG. 3 is a fragmentary sectional view of one method of orbitally driving the orbiting scroll member in accordance with the present invention.

During testing of this system, a prototype structure was constructed for electrochemical machining of scrolls in a manufacturing environment. Shown in FIG. 3, is a sectional view of the test set up used to control clearance space 15 between scroll members 14 and 16 and orbiting motion of scroll member 16.

In an exaggerated view, as shown, an insulative spacer 68 constructed from high dielectric plastic material was interfit between the fixed scroll member 14 and main bearing 69. The thickness of insulative spacer 68 was adjusted to assure the proper clearance distance between wrap tips 21 and 31 and their respective face surfaces 30 and 22. Spacer 68 relies on its physical dimension between fixed scroll member 14 and main bearing 69 to control the minimum clearance between the wrap tips and scroll base members. Alternatively, in actual production, this clearance may be controlled automatically via the clamping means 58 or drive means 56 by adding the ability to axially move one or both of the means in response to a signal from control unit 34. Other means to control the axial spacing between the wraps are possible, such as interfitting a precisely sized sliding insulator between face surfaces 22 and 30.

Orbiting motion of orbiting scroll member 16 is caused by eccentric 70 inserted into hub 33 attached on top of rotating crankshaft 72. Crankshaft 72 is connected to a motor (not shown). During motor activation and rotation of crankshaft 72, eccentric 70 causes orbiting piston 16 to orbit relative fixed scroll 14 in a known manner. To prevent rotation of orbiting scroll member 16, an Oldham ring 73 is used to prevent rotation of orbiting scroll member 16 just as in a scroll compressor.

By controlling the eccentricity of eccentric 70 upon crankshaft 72, the orbital stroke of orbiting scroll member 16 may be controlled. In reducing the eccentricity of eccentric 70, the actual orbital stroke of orbiting scroll member 16 is shortened compared to the orbit circumference normal to a scroll compressor. In a scroll compressor, the normal orbit of the orbiting scroll 16 causes it to radially touch and seal with fixed scroll 14. If a crankshaft 72 and eccentric from a normal scroll compressor had been utilized, it would have orbited orbiting scroll member 16 too far in a radial direction, thereby permitting contact between scroll wraps 20 and 32. As state previously, contact between scroll wraps 20 and 32 is inadvisable during the ECM process.

In operation under production conditions, an orbiting scroll member 16 is fixedly attached to an orbiting drive means 56 via a clamping means 58 such as a clamp or chuck 58 (FIG. 2). A fixed scroll member 14 is precisely interfit over orbiting scroll member 16 and connected to an inlet and outlet for electrolyte flow such as inlet passageway 44 and passageway 42. Top 40 is then closed.

Control unit 34 activates pump 50 thereby pumping electrolyte solution from tank 46 into clearance space 15 between the scroll members and between the wraps themselves.

Figure 5:
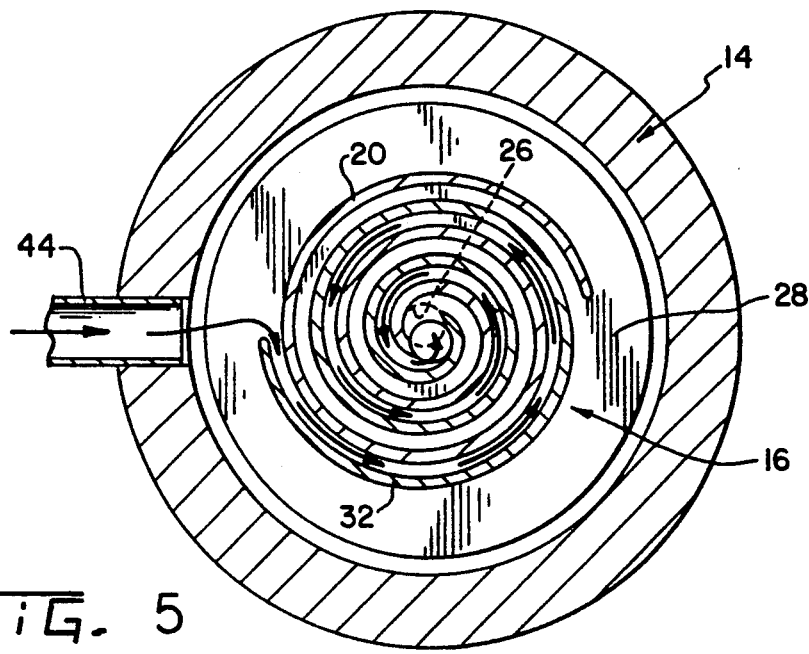
FIG. 5 is a sectional view of the two scroll members taken along line 5—5 of FIG. 3.

FIG. 5 shows the flow of electrolyte (represented by arrows) through passageway 44 into the interior of fixed scroll member 14. The electrolyte flows between fixed scroll wrap 20 and orbiting scroll wrap 32 throughout the entire path normally used to compress refrigerant. More particularly, electrolyte enters the scroll set through suction inlet port 24 and is discharged through outlet discharge port 26. The orbiting motion of orbiting scroll member 16 creates a differential pressure between suction port 24 and discharge port 26 in a known manner causing suction at suction port 24. This pumping of the electrolyte by the orbiting scroll member 16 assists in stock removal. The electrolyte assures that the wraps 20 and 32 will be properly electrochemically machined. After flowing through the scroll members 14 and 16, electrolyte flows out from between the scrolls through fluid outlet port 26

Orbiting drive unit 56 activated by control unit 34 via control line 62, orbits orbiting scroll member 16 relative fixed scroll member 14 in a short stroke manner. Orbiting scroll member 16 does not touch any portion of fixed scroll member 14 in the radial or axial directions. The orbiting of scroll member 16 also compresses the electrolyte between the wraps, drawing it faster through the compressor and assisting in pumping it through port 26.

At this time, control unit 34 applies an electric charge or current via line 38 onto fixed scroll 14 thereby causing a charge differential between fixed scroll member 14 and orbiting scroll member 16.

The actual current and voltage utilized in electrochemical machining is dependent upon a number of factors such as the spacing between the scroll members, the type and concentration of the electrolyte solution, and the quality of the contacts between the scroll members and the control unit 34. In one such apparatus utilized by the inventors, a voltage potential of approximately 4 volts is set up between the orbiting and fixed scrolls 16 and 14 along with an DC current of approximately 200 amperes. Alternatively, other voltages and currents may be utilized as is known in the art of electrochemical machining.

An important item for manufacturability of scroll members is the cycle time in which this machining process takes place. Cycle time refers to the amount of time at which current is applied through the scroll members. The shortest possible cycle time would maximize the throughput of the electrochemical machine apparatus.

An initial cycle time found to be satisfactory by the inventors is one in which current is applied to the scroll set for a ten second time period then shut off for one minute. During this shutdown time, orbiting drive 56 remains running while the electrolyte solution remains flowing through the parts, flushing the electrochemically separated material from the scrolls up and out through discharge port 26. After approximately one minute of flushing, the scroll set is charged again for another ten seconds.

The surface finish of scroll members 14 and 16, after the ECM process, is not smooth like a mirror but roughened much like a sandblasted finish. More precisely, the roughened surface may be described as either particulate, non-directional, or protuberant. Counter to conventional thinking, the roughened, non-direction, or particulate wear surfaces wear in quicker than polished surfaces. A benefit of the ECM process is that of averaging out the surface profile of the wear surfaces which eliminates any swirl type or cross type grooves resulting from the initial machining of the scroll members, thereby reducing leak paths.

The ECM process described above is able to create surface finishes by approximately 70 Ra. Ra, as is known in the art, is the roughness average, determined by the absolute value of the measured profile height deviations measured from the graphical centerline of the surface. Ra is measured in $\mu m$. For proper operation of the wear in process, the Ra of the electrochemically machined surfaces should be 70 $\mu m$ or less. Surface finishes above 70 Ra increase the wear in time of the compressors, and are not desirable.

Figure 6:
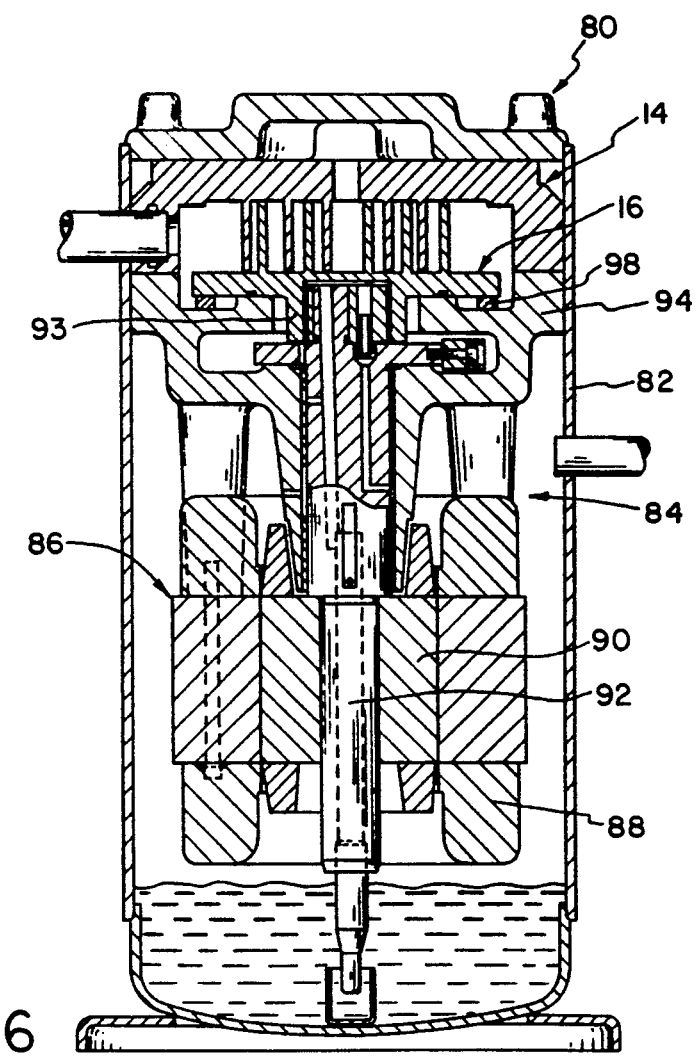
FIG. 6 is a front sectional view of a compressor including the electrochemically machined scroll members of the present invention.

As shown in FIG. 6, a typical scroll compressor 80 is assembled with the fixed orbiting scrolls 14 and 16 from the above process. The scroll compressor 80 shown includes a housing 82 and orbiting drive means 84 as is known in the art. Orbiting drive means 84 comprises a motor 86 having a stator 88 and rotor 90. Rotor 90 is attached to a crankshaft 92 which passes through main bearing 94. Crankshaft 92 is inserted into hub 93 on the back of orbiting scroll 16. A conventional Oldham ring 98 is interfit between orbiting scroll member 16 and main bearing 94 causing orbiting scroll member 16 to undergo orbiting movement. U.S Pat. No. 5,088,906, assigned to the assignee of the present invention, includes a complete description of a similar scroll compressor able to utilize the electrochemically machined scrolls, and is expressly incorporated by reference herein.

As known in the electrochemical machining art, it is possible to alternate the charge from positive to negative and back again between the two electrodes (i.e., the scroll members) to effectively electrochemically machine both sets of parts. The amount of stock removal from the anode scroll member is a function of the amperes applied versus the distance between the electrodes.

Other variables to ECM may include changes in cycle times to alter the amount of material removed. A relationship exists that longer current cycle times machine more material away from the scroll members. Additionally, alternate electrolytes may be used to create the proper current densities between all the points in clearance space 15.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for electrochemical machine lapping a set of two scroll members, said method comprising:
   intermeshing said scroll members so that a clearance space exists between said scroll members;
   pumping an electrolyte into said clearance space; and
   applying an electric current between said scroll members and through said electrolyte, whereby electrochemical removal of metal from said scroll set takes place.

2. The method of claim 1 in which said intermeshed scroll members are orbited relative to each other, thereby causing removal of metal adjacent all wear surfaces.

3. The method of claim 1 further comprising the step of orbiting said intermeshed scroll members relative to each other in a short stroke.

4. The method of claim 3 in which said intermeshed scroll set includes a suction opening and a discharge opening, both communicating with said clearance space, said orbiting motion of said intermeshed scroll members creating suction at said suction opening.

5. The method of claim 1 in which each said intermeshed scroll member includes a wrap attached to a base plate, said intermeshed members spaced apart so that the minimum clearance space between said scroll wraps is substantially equal to the clearance space between each said wrap and an opposing scroll base plate.

6. A method of treating the surface areas of interfitting scroll members to reduce leak paths between said members, said method comprising:
   orbiting said interfitting scroll members relative to one another;
   exposing the surface areas between said scroll members to an electrolyte solution; and
   applying a voltage across said scroll members to electrochemically remove portions of said scroll member surface areas thereby reducing leak paths therebetween.

7. The method of claim 6 further comprising preventing contact between said scroll members.

8. The method of claim 6 further comprising pumping the electrolyte between said scroll members.

9. A compressor comprising:
   a housing;
   a scroll set disposed within said housing, said scroll set including a fixed scroll member and an orbiting scroll member both having electrochemically machined surfaces prepared by orbiting said scroll members together, exposing areas between said scroll set to an electrolyte solution, and applying an electric charge to one of the scroll members to electrochemically remove portions of said scroll set; and
   drive means to orbit said orbiting scroll relative said fixed scroll.

10. The compressor of claim 9 in which said scroll members have electrochemically machined surfaces having a finish of 70 Ra or less.

11. An apparatus for electrochemically machining the respective surfaces of a complementary pair of fixed and orbiting scroll members for use in a scroll compressor, comprising:
- a mechanism for holding the fixed and orbiting scroll members in aligned positions such that the involute wrap faces of the fixed and orbiting scroll members interfit;
- a supply of electrolyte between said fixed and orbiting scroll members;
- a source of electric current applying electric current through said electrolyte between said fixed scroll member and said orbiting scroll member; and
- driving means for orbiting said orbiting scroll member relative said fixed scroll member during the application of said current to enable electrochemical machining of the fixed and orbiting scroll members.

12. The apparatus of claim 11 in which said mechanisms holding said scroll members including associated scroll wraps holds said scroll member in a spaced relationship apart so that the minimum clearance space between said scroll wraps is substantially equal to the clearance space between each said wrap and its opposing scroll member.

13. The apparatus of claim 11 in which said drive means orbits said orbiting scroll member in a short stroke whereby radial contact between said scroll members is prevented.

* * * * *